Aug. 26, 1969  K. E. SMITH  3,463,578
PANORAMIC REAR AND SIDE VIEW MIRROR SYSTEM
Filed April 12, 1965
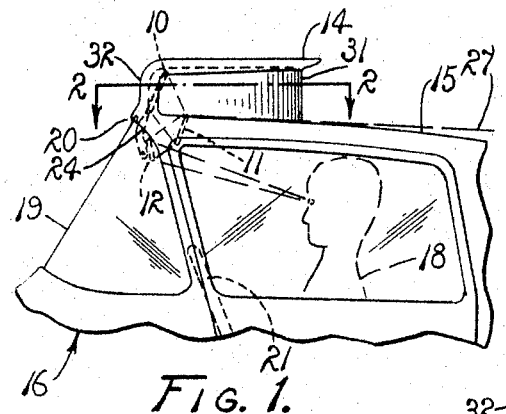
FIG. 1.
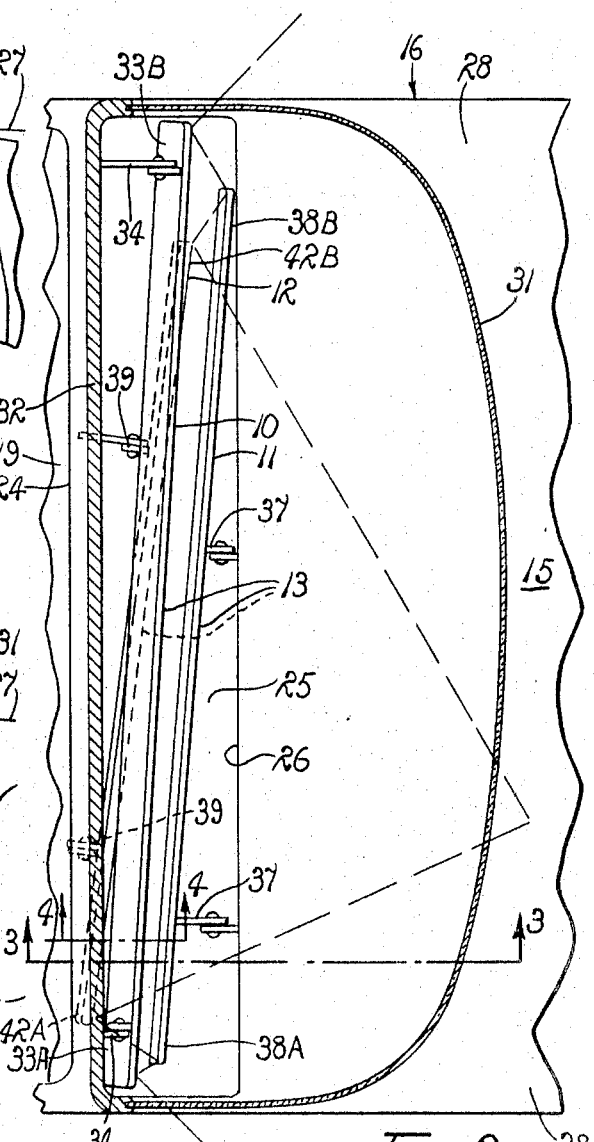
FIG. 2.
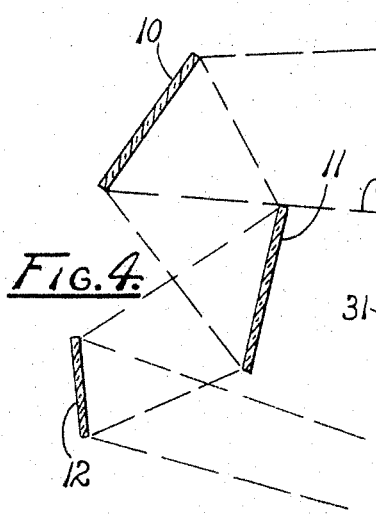
FIG. 3.
FIG. 4.
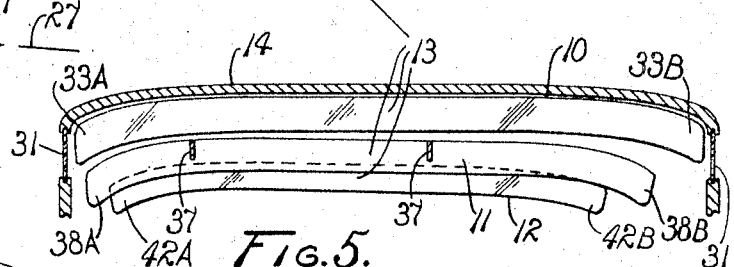
FIG. 5.
KARL E. SMITH
INVENTOR
Huebner & Worrel
ATTORNEYS United States Patent Office 3,463,578
Patented Aug. 26, 1969

3,463,578
PANORAMIC REAR AND SIDE VIEW MIRROR SYSTEM
Karl E. Smith, Box 167, Auberry, Calif. 93602
Continuation-in-part of application Ser. No. 369,355, May 15, 1964. This application Apr. 12, 1965, Ser. No. 447,140
Int. Cl. G02b 5/08
U.S. Cl. 350—302
3 Claims

ABSTRACT OF THE DISCLOSURE

A panoramic rear and side view mirror system for a vehicle comprising three planar mirrors arranged above and forwardly of the driver of the vehicle, the uppermost mirror having a length nearly equal to the width of the roof of the vehicle and approximately centered on the center line of the vehicle, and each of said lower mirrors being sized, shaped and positioned to reflect only the image of the preceding mirror.

This invention relates to a rear view mirror system and more particularly to such a mirror system providing the operator of a motor vehicle or the like with a clear, undistorted and uninterrupted panoramic view rearwardly and laterally of the vehicle.

The present application is a continuation-in-part of my prior copending United States patent application Ser. No. 369,355, filed May 15, 1964 now abandoned.

High speed travel of motor vehicles on modern highways and expressways makes it imperative that drivers see more than conventional rear view mirrors allow. Conventional mirrors on motor vehicles, whether mounted inside or outside of the vehicles, fail to permit visual inspection by the drivers of substantial areas of hazard without moving their eyes from the road ahead.

Previous attempts to provide wider and less obstructed vision have been unsuccessful due to the problem of distortion. Convex-surfaced mirrors tend to effect distortion of angles and distances such that their use creates greater hazards. Prior to the present invention, planar-mirrored surfaces have not been successfully utilized in such connection so as to provide a broad range of vision. When several planar mirrors have been utilized for this purpose, the combination devised has caused confusing and dangerous blind spots. Further, previous combinations of planar mirrors have led to distortions of distance and dimensions due to improper inter-relation or excessive spacing of the mirrors.

The use of conventional vehicular rear view mirrors requires that each vehicle have a rear window to allow an operator to have a rearward line of sight through the vehicle interior. This requirement limits the interior srtucture of a vehicle and restricts variation in the heights of seats and the addition of top-reinforcing members. Such improvements offer obvious advantages in the realm of passenger safety. A rear window, in itself, has the disadvantage of allowing glare from the sun to cause discomfort to passengers as well as discoloration of the vehicles interior.

Operations involving other types of equipment also require all-round fields of observation for the operators in order to minimize operational hazards. For instance, operations involving elevators, cranes and equipment utilized in earth moving, mining, and stevedoring all involve hazards of inadequate observation. In still other operational environments, the hazards of inadequate observation may not be severe but the conveniences of wide-angle rear view vision are appreciable.

Therefore, it is an object of this invention to provide a panoramic rear and side view mirror system of general application.

Another object is to provide such a system for motor vehicles and the like allowing their operators broad panoramic fields of lateral and rearward observation.

Another object is to provide such a mirror system providing completely free and continuous vision throughout the entire range of observation.

Another object is to provide such a mirror system presenting a clearly visible image for convenient viewing by the user.

Another object is to provide such a mirror system which presents a panoramic view without distortion of distances or angles, or of size or shape of images.

Another object is to provide such a mirror system which allows a vehicle operator to observe the entire panoramic view within a convenient and comfortable angle of vision.

Another object is to provide such a mirror system which eliminates the need for a vehicular rear window.

Another object is to provide such a mirror system which, by eliminating the need for rear vision through a rear window, allows the use of vehicular seats having high backs for prevention of serious injury from whiplash or the like.

Another object is to provide such a mirror system which, by eliminating the need for rear vision through a rear window, allows the use of additional structural members behind the operator's seat for reinforcing the vehicle top and thereby minimizing accidental injury to vehicle occupants.

Another object is to provide such a mirror system which enhances ease of observation by a vehicle operator by diminishing glare.

Another object is to provide such a mirror system which allows a vehicle operator conveniently to observe any vehicle within his normal distance of vision without having to diret his eyes rearwardly.

These, together with other objects, will become more fully apparent upon reference to the following description and accompanying drawings.

In the drawings:

FIG. 1 is a side elevation of a mirror system of the present invention mounted on the top of a motor vehicle, which is fragmentarily represented.

FIG. 2 is a somewhat enlarged plan view of the mirror system of FIG. 1 as viewed in a horizontal section of the motor vehicle taken in a plane represented by line 2—2 of FIG. 1.

FIG. 3 is a somewhat enlarged vertical section of the mirror system of FIG. 1 taken longitudinally of the motor vehicle in a plane represented by line 3—3 in FIG. 2.

FIG. 4 is an enlarged diagrammatic section of the mirrors taken in a plane represented by line 4—4 therein.

FIG. 5 is a schematic vertical section of the vehicle of FIG. 1 taken in a plane represented by line 5—5 therein and showing the mirror system of FIG. 1.

Referring more particularly to the drawings, three mirrors combined in a system embodying the principles of the present invention are shown respectively at 10, 11, 12. Each mirror preferably has substantially a planar reflecting surface with a geometric center 13. They are situated beneath a support housing 14 mounted on the top surface or upper portion 15 of a hard-top motor vehicle 16 in front of an operator 18. The invention is readily adaptable, however, to use with open top vehicles, not shown.

The vehicle 16 has a front windshield, the upper edge 20 of which is preferably disposed forwardly of the vehicle steering wheel 21 a sufficient distance to allow positioning of all of the mirrors forward of the steering wheel, as will subssequently be described. The top surface 15 of the vehicle terminates short of the windshield frame 24 to provide a space or opening 25 between its front edge 26 and the frame, for disposition of the mirrors. The top surface preferably declines continuously rearwardly from its front edge. The preferred degree of declination is indicated by a representative line of declination 27, as shown in FIG. 1, and is sufficient to allow a rearward line of sight covering close-in areas at the rear of the vehicle, as desired. The opposite lateral portions 28 of the top surface curve downwardly in a typical manner.

The support housing 14 is mounted above the opening 25 in covering relation thereto. It is appropriately weatherproof, as well as protective against sun glare. At the same time, the housing allows an unobstructed line of sight to the rear and sides of the vehicle 16 through a transparent window 31 extending around the periphery of the housing, rearwardly of mirror 10. The housing includes a forward wall 32 which may be integral with the windshield frame 24.

Third mirror element 10 is elongated and in silhouette curved downwardly at its opposite ends 23 to conform substantially to the configuration of the top surface 15 across its entire lateral extent. The mirror is preferably rigidly mounted on the forward wall 32 of the housing 14 by means of bolted brackets 34 or the like so that its lower edge lies on the line of declination 27, as shown in FIG. 4. The mirror surface itself must be of a substantial length to accommodate a wide range of lateral reflection and of sufficient width to allow adequate vertical extent of observation. It has been found that for best results the mirror surface should be centered approximately on the longitudinal center line of the vehicle, not shown, and should extend substantially the entire lateral extent of the vehicle top surface.

The end 33B of mirror 10 more remote from the operator 18 is angled rearwardly to a degree sufficient to provide the operator with a panoramic rearward view centered on the longitudinal center line of the vehicle. For right-hand-drive vehicles, not shown, this angling of mirror 10 is reversed. For center-drive vehicles, not shown, the disposition of mirror 10 would be substantially parallel to the windshield 19.

Second mirror element 11 is rigidly mounted on the vehicle 16 by means of bolted brackets 37 or the like. It is disposed below mirror 10 and rearwardly thereof in the opening 25, with its reflective surface facing in the direction generally opposite to that of mirror 10. Mirror 11 is smaller than mirror 10 but is substantially similarly shaped so that its horizontal and vertical extent is sufficient to encompass the entire reflected view of mirror 10 while relaying the image on to the operator 18. The end 38A of mirror 11 closer to the operator 18 is angled forwardly as necessary for this purpose. In its preferred position, the top edge of mirror 11 at its end portion nearer the operator is disposed on the line of declination 27, extended, of the vehicle top surface 15. Its oposite end 38B is disposed at a lower elevation, as shown in FIG. 5, as necessary to reflect towards the operator the entire extent of mirror 11.

First mirror element 12 is smaller than mirror 11 but is substantially similarly shaped so that its horizontal and vertical extent is sufficient to encompass the entire reflected view of mirrors 10 and 11 while relaying the image on to the operator 18. It is mounted on the vehicle 16 preferably by means of brackets 39, or the like, secured to the forward wall 32 of the housing 14 or the windshield frame 24 as desired. The brackets are preferably jointed to allow pivoting the mirror about a substantially horizontal axis, as necessary to accommodate the mirror system to different operators. Mirror 12 is positioned below mirror 10 and forward of mirror 11. It is disposed preferably on the operator's side of the vehicle so that his normal line of sight toward the road ahead is not significantly interrupted when he glances at the mirror. Its end 42A nearer to the operator is preferably at a higher elevation than its opposite end 42B as necessary to reflect to the operator the full images of mirrors 10 and 11.

The relative spacing of the mirrors, longitudinally of the vehicle 18, is such that the operator 18 may perceive the reflected images without distortion of distances or dimensions. It has been found that when mirror 11 is spaced too far from mirrors 10 and 12, such distortion occurs. For best results, the mirror ends 33A, 38A and 42A, i.e., those closer to the operator, should be disposed rearwardly of the steering wheel 21. Mirror 11, however, may be disposed rearwardly of the steering wheel, provided that all three mirrors are spaced as closely together as possible without blocking the reflected line of sight. It has been found that the mirrors function extremely well when mirror 11 is spaced approximately two-and-one-half (2½) inches from mirror 10 at the end nearer the operator and approximately three-and-one-half (3½) inches therefrom at the opposite end. At the same time, mirror 12 functions excellently when spaced about 3-and-one-half (3½) inches from mirror 11 at the end nearer the operator, and approximately one (1) inch therefrom at the opposite end. With the mirrors so disposed, the spacing along the line of sight between centers of the respective oppositely facing mirrors is approximately 0.4 to 0.7 times the difference in length between said respective oppositely facing mirrors. The invention is not to be limited to these specific distances, however, since other spacing is possible and effective, depending upon the size and position of the operator, as well as the size and shape of the vehicle. It should be recognized, however, that for closer spacings the distortion is substantially eliminated. Such closer spacing also has the advantage of minimizing the space requirements for the system and allows more room inside the vehicle.

The mirrors are disposed initially in the described relation so as to provide an operator with an angular range of vision extending laterally to a substantially equal degree on each side of the vehicle. The initial adjustment for this purpose may be accomplished in any convenient manner. Once the mirrors are disposed in proper relation, mirrors 10 and 11 are secured in permanent position. Mirror 12 is frictionally held in position by means of its jointed brackets 39 but may be adjusted to suit the convenience of different operators 18.

When the mirrors are in position, the operator 18 has a panoramic, vastly increased range of vision extending rearwardly of the vehicle 16 and laterally thereof up to an angle of approximately forty-five (45) degrees on each side of the vehicle, as shown in FIG. 2. Without removing his eyes from the road ahead, he can view with continuous uninterrupterd clarity a range including the normally hazardous "blind spot" occupied by overtaking and passing vehicles on the left as well as the also normally hazardous "blind spot" occupied by overtaken and passed vehicles on the right. A clearly viewable portion of every car on the road will at all times be visible to the operator. This wide range of observation is easily and quickly scanned within the relatively small area of mirror 12 and without need of directing the eyes rearwardly.

From the above description, it is evident that the reflected line of sight is directed upwardly through the opening 25, as shown in FIG. 4, and rearwardly and laterally across the top surface 15 without ever passing through a rear window. Furthermore, the three mirrors cooperate to produce a polaroid effect in the reflected view, such that any glare is diminished and the reflected light becomes relatively subdued for comfortable viewing. The slope of the line of declination 27 may be varied to provide more close-in rearward vision, as desired. In the present embodiment, mounted on a conventional standard size automobile, ground-llevel objects are readily observable up to within thirty-five (35) feet of the rear of the vehicle 16. Similarly, the downward curvature of the top-surface side portions 28 determine the extent of close-in lateral vision, since the mirrors are shaped to conform to these side portions and in the present embodiment allow observation of ground-level objects up to within two (2) feet of the sides of the vehicle.

From the foregoing, it is evident that a panoramic rear and side view mirror system has been provided allowing the operator of a motor vehicle or the like an obstructed, undistorted line of sight covering a full range of observation laterally and rearwardly of the vehicle. Furthermore, the mirror system presents in the small easily scanned area of mirror 12 or 112 a clearly visible image for convenient viewing by the operator. As a result, the safety of motor vehicle operation is substantially improved and the need for vehicle rear windows is eliminated.

Although the invention has been herein shown and described in what is conceived to be the most practical and preferred embodiment, it is recognized that departures may be made therefrom within the scope of the invention, which is not to be limited to the details disclosed herein, but is to be accorded the full scope of the claims so as to embrace any and all equivalent devices and apparatus.

Having described my invention, what I claim as new and desire to secure by Letters Patent is:

1. A panoramic rear and side view mirror system for a vehicle having side members supporting a roof and a driving position displaced from the center of said vehicle comprising:
   a first planar element having a mirrored surface facing rearwardly;
   a second planar element having a mirrored surface facing forwardly;
   a third planar element positioned above said roof centered approximately on the center line of said roof and having a mirrored surface facing rearwardly and having a length nearly equal to the width of said roof;
   means mounting all of said elements forwardly and upwardly of a predetermined observation point in an arrangement in which:
      (a) the sight line distances between mirrors are not substantially disproportionate and are less than the distance from the observation point to the first element,
      (b) said elements being relatively closely disposed to one another,
      (c) said second element being at an elevation relatively higher than said first element and said third element being at an elevation relatively higher than said second element;
      (d) said elements being positioned at an angle on the horizontal to the transverse axis of the vehicle;
   said second element being dimensionally larger than said first element and said third element being dimensionally greater than said second element with the areas of said first and second mirrors being shaped so that the image field of said first mirror element is co-extensive with and exclusively the image field of said second and third mirror elements; wherein said third planar element is shaped in silhouette to curve downwardly at both ends so that said ends are positioned at a lower elevation than the middle portion of said elements; and said first and second elements are shaped so that the image field of said first mirror element is coextensive with and exclusively the image field of said second and third element; and
   the end of said second mirror element most distant from the driver being positioned at an elevation lower than the end adjacent the driver and the edge curvature of the first and second mirror elements at their ends nearest the driver position are greater than the edge curvature at their respective opposite ends.

2. A panoramic rear and side view mirror system as described in claim 1 wherein: the widths of each mirror element are substantially constant.

3. A panoramic rear and side view mirror system as described in claim 1 wherein: said roof edge curves downwardly at its side edges; said lower edge of said third mirror element is contoured in substantial conformity to said roof edge cross section and said lower edge of said third mirror is substantially on or above said roof edge; and said roof edge declines in elevation from front to rear beginning at substantially said third mirror element.

References Cited

UNITED STATES PATENTS 1,687,572  10/1928  Hodny _____ 350—307
1,905,323  4/1933   Wallace _____ 350—293

FOREIGN PATENTS 924,721  5/1963  Great Britain.

DAVID SCHONBERG, Primary Examiner

M. TOKAR, Assistant Examiner